US009883388B2

(12) United States Patent
Kim et al.

(10) Patent No.: US 9,883,388 B2
(45) Date of Patent: Jan. 30, 2018

(54) EPHEMERAL IDENTITY FOR DEVICE AND SERVICE DISCOVERY

(71) Applicant: Intel Corporation, Santa Clara, CA (US)

(72) Inventors: Sanghoon Kim, Santa Clara, CA (US); Minyoung Park, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 13/712,304

(22) Filed: Dec. 12, 2012

(65) Prior Publication Data

US 2014/0162601 A1    Jun. 12, 2014

(51) Int. Cl.
*H04W 12/06* (2009.01)
*H04W 8/00* (2009.01)
(Continued)

(52) U.S. Cl.
CPC .......... *H04W 12/06* (2013.01); *H04W 8/005* (2013.01); *H04W 76/023* (2013.01);
(Continued)

(58) Field of Classification Search
CPC ..... H04W 12/04; H04W 12/06; H04W 12/08; H04W 76/023; H04W 4/005;
(Continued)

(56) References Cited

U.S. PATENT DOCUMENTS 6,072,875 A    6/2000  Tsudik
7,492,744 B2 *  2/2009  Dooley et al. ................ 370/338
(Continued)

FOREIGN PATENT DOCUMENTS

CN      104823471 A    8/2015
WO   WO-2009092115 A3  7/2009
(Continued)

OTHER PUBLICATIONS

OCR of U.S. Appl. No. 61/639,535.*
(Continued)

*Primary Examiner* — Matthew Sams
(74) *Attorney, Agent, or Firm* — Schwegman Lundberg & Woessner, P.A.

(57) ABSTRACT

Embodiments of a system and method for secure discovery and identification of devices via a wireless network are generally described herein. In some embodiments a wireless device may transmit an anonymous ephemeral identifier that may be utilized by a second device to determine, by accessing a provider or social network, whether the private identity masked by the ephemeral identifier is known to the user of the second device. In some embodiments a provider may receive user or device registrations; maintain a record of private identifiers, ephemeral identifiers, and known user data for a plurality of users; and access one or more social networks to acquire known user data. The ephemeral identifiers may be periodically updated by the provider. In some embodiments a discovery module in a plurality of devices may automatically establish a communication connection between devices in response to a previously established relationship between users of the respective devices.

19 Claims, 8 Drawing Sheets

(51) Int. Cl.
*H04W 76/02* (2009.01)
*H04W 8/26* (2009.01)
*H04L 29/06* (2006.01)
*H04W 12/02* (2009.01)
*H04W 12/04* (2009.01)

(52) U.S. Cl.
CPC ........... *H04L 63/0407* (2013.01); *H04W 8/26* (2013.01); *H04W 12/02* (2013.01); *H04W 12/04* (2013.01)

(58) Field of Classification Search
CPC ..... H04W 8/005; H04W 84/18; H04W 12/02; H04W 76/02; H04W 88/06; H04L 63/0823; H04L 63/0869; H04L 63/18; H04L 63/08; G06F 21/57
See application file for complete search history.

(56) References Cited

U.S. PATENT DOCUMENTS

| | | | | |
|---|---|---|---|---|
| 8,260,261 | B2* | 9/2012 | Teague | 455/411 |
| 8,594,632 | B1* | 11/2013 | Azizi et al. | 455/411 |
| 8,831,224 | B2* | 9/2014 | Bai et al. | 380/270 |
| 2007/0026794 | A1* | 2/2007 | Ayyagari et al. | 455/11.1 |
| 2009/0077643 | A1* | 3/2009 | Schmidt et al. | 726/6 |
| 2010/0062758 | A1* | 3/2010 | Proctor, Jr. | G06Q 30/0623 455/426.1 |
| 2010/0285774 | A1* | 11/2010 | Ginzboorg | 455/411 |
| 2011/0252235 | A1* | 10/2011 | Dolan et al. | 713/168 |
| 2011/0258313 | A1* | 10/2011 | Mallik | H04W 8/005 709/224 |
| 2011/0265158 | A1* | 10/2011 | Cha et al. | 726/6 |
| 2012/0287820 | A1* | 11/2012 | Latvakoski | 370/255 |
| 2013/0046972 | A1* | 2/2013 | Campagna et al. | 713/156 |
| 2013/0198838 | A1* | 8/2013 | Schmidt et al. | 726/22 |
| 2014/0112474 | A1* | 4/2014 | Escott et al. | 380/270 |
| 2014/0162601 | A1* | 6/2014 | Kim et al. | 455/411 |
| 2014/0317707 | A1* | 10/2014 | Kim et al. | 726/6 |
| 2015/0142986 | A1* | 5/2015 | Reznik et al. | 709/228 |

FOREIGN PATENT DOCUMENTS

WO WO-2012137633 A1 10/2012
WO WO-2014092768 A1 6/2014

OTHER PUBLICATIONS

OCR of U.S. Appl. No. 61/673,485.*
OCR of U.S. Appl. No. 61/715,053.*
"IEEE Standard for Air Interface for Broadband Wireless Access Systems: Amendment 1: Enhancements to Support Machine-to-Machine Applications", IEEE Std 802.16p-2012. IEEE Computer Society. IEEE Microwave Theory and Techniques Society., (Oct. 8, 2012), 82 pgs.
"International Application Serial No. PCT/US2013/043393, International Search Report dated Jul. 29, 2013", 3 pgs.
"International Application Serial No. PCT/US2013/043393, Written Opinion dated Jul. 29, 2013", 5 pgs.
Lee, Ki-Dong, et al., "Throughput comparison of random access methods for M2M service over LTE networks", 2011 IEEE GLOBECOM Workshops (GC Wkshps), (2011), 373-377.
"European Application Serial No. 13861757.6, Extended European Search Report dated Jun. 16, 2016", 9 pgs.
"European Application Serial No. 13861757.6, Response filed Jan. 16, 2017 to Extended European Search Report dated Jun. 16, 2016", 15 pgs.

* cited by examiner

EPHEMERAL IDENTITY FOR DEVICE AND SERVICE DISCOVERY

TECHNICAL FIELD

Embodiments pertain to wireless communications. Some embodiments relate to the use of an ephemeral identity for device or service discovery. Some embodiments relate to secure discovery and communication between devices that are enrolled in a social network.

BACKGROUND

An issue with communicating data over a wireless network is the discovery and identification of devices. Due to the broadcast nature of wireless communication it may be possible for a malicious user or device to "eavesdrop" on the wireless communication and thereby obtain personal or identifying information. The loss of personal or identifying information may lead to undesirable identity theft or impersonation that may result in further data or financial loss.

Thus there are general needs for systems and methods that reduce exposure of personal or identifying information to unauthorized devices, while allowing associated users or devices to securely discover and communicate with each other.

BRIEF DESCRIPTION OF THE DRAWINGS

Some embodiments are illustrated by way of example and not limitation in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
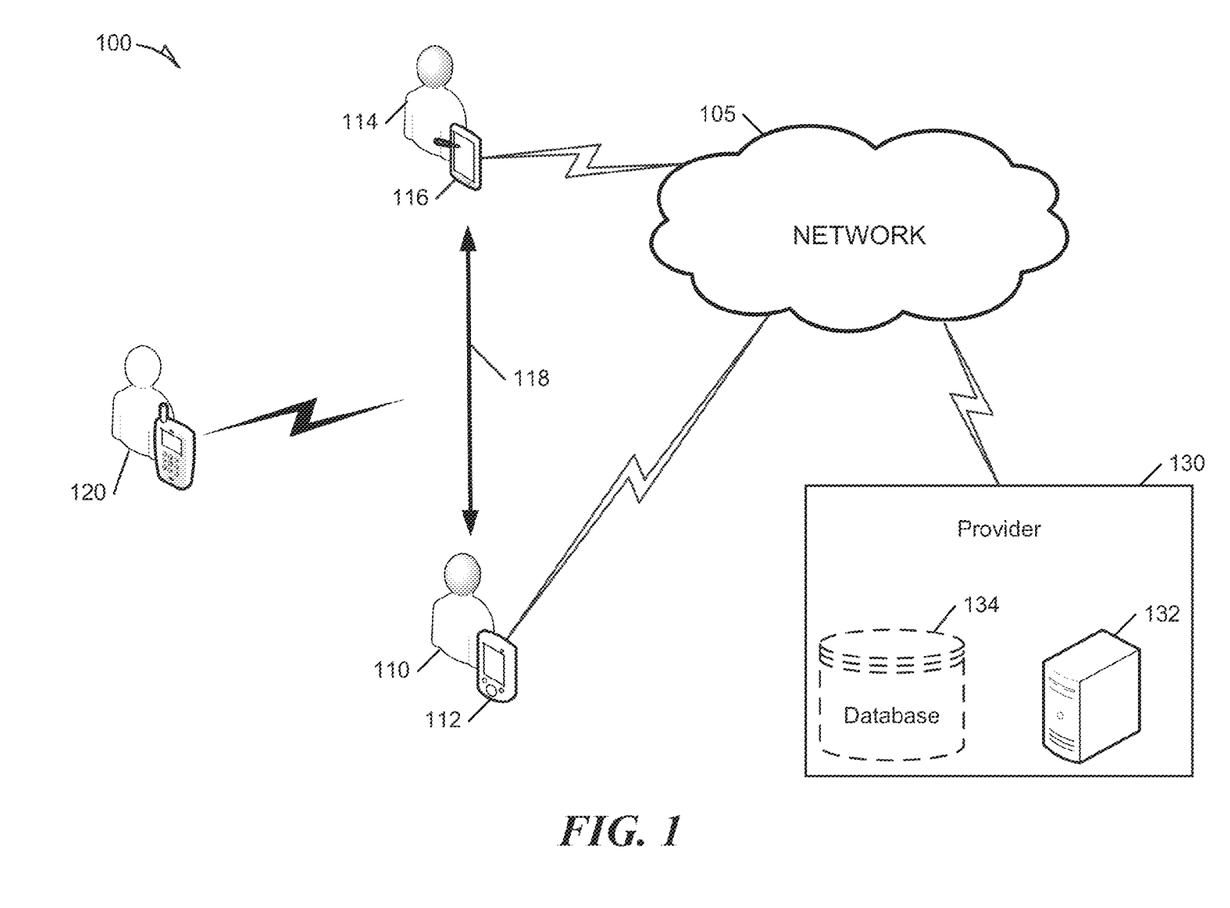
FIG. 1 is a block diagram of an example communication system in accordance with some embodiments.

FIG. 1 depicts an exemplary communication system 100 that may include a network 105, a first user 110, a first device 112 (e.g., user equipment, smart phone, personal digital assistant (PDA), laptop computer, tablet computer, personal computer, or other machine capable of some form of data connectivity), a second user 114, a second device 116 (e.g., user equipment or a first enhanced node B (eNodeB)), and a provider 130. The first user 110 and the second user 114 may wish to engage in wireless communications 118 via their respective devices 112, 116 (e.g., device-to-device (D2D) communications). The first user 110 and the second user 114 may wish to avoid a third-party 120 intercepting or "eavesdropping" on wireless communications 118, or obtaining information that would allow the third-party 120 to ascertain an identity of the first user 110 or the second user 114. The wireless communications 118 between devices 112, 116 may utilize a Wi-Fi or IEEE 802.11 standard protocol, or a protocol such as the current 3rd Generation Partnership Project (3GPP) long term evolution (LTE) time division duplex (TDD)-Advanced systems. In one embodiment, the communications network 105 comprises an evolved universal terrestrial radio access network (EUTRAN) using the 3rd Generation Partnership Project (3GPP) long term evolution (LTE) standard and operating in time division duplexing (TDD) mode.

The steps from discovery to final communication may be performed via direct, P2P communications, over an unencrypted wireless medium. The discovery and authentication techniques may facilitate D2D connections established using any of a variety of network protocols and standards in licensed or unlicensed spectrum bands, including Wi-Fi P2P communications performed in connection with an IEEE 802.11 standard (for example, Wi-Fi Direct communications facilitated by software access points (Soft APs)), 3GPP LTE/LTE-A communications (for example, LTE Direct (LTE-D) communications established in a portion of an uplink segment or other designated resources), machine-to-machine (M2M) communications performed in connection with an IEEE 802.16 standard, and the like.

In some embodiments, first device 112 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive or transmit information wirelessly.

Antennas in or on first device 112 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to utilize spatial diversity and the different channel characteristics that may result between each of the antennas and the antennas of a transmitting station. In some MIMO embodiments, antennas may be separated by up to $1/10$ of a wavelength or more.

In some embodiments, the first device 112 may include one or more of a keyboard, a display, a non-volatile memory port, multiple antennas, a graphics processor, an application processor, speakers, and other mobile device elements. The display may be an LCD screen including a touch screen. The second device 116 may be similar to first device 112, but does not need to be identical. The second device 116 may include some or all of the features, components, or functionality described with respect to first device 112.

A base station, such as enhanced or evolved node B (eNodeB), may provide wireless communication services to communication devices, such as device 112, device 116, or other UE. The network 105, may include a carrier-based network (e.g., a LTE/LTE-A cell network operating according to a standard from a 3GPP standards family) is established by network equipment (e.g., an eNodeB) communicating with mobile devices 112, 116 (e.g., user equipment (UE)).

The provider 130 may include a server 132, having one or more processors, coupled to a database 134. The provider 130 may be capable of communicating with the first user 110 and the second user 114 via network 105. For example, the server 132 may be configured to communicate with devices 112, 116 over one or more wired or wireless protocols supported by network 105. Network 105 may include a private intranet, or the Internet. In an example, the provider 130 may operate the network 105.

The database 134 may contain a record associated with each user. The record for each user may include an ephemeral identifier assigned to the user and a private identifier associated with an identity of the user. The private identifier may include a phone number, an e-mail address, a username, or other unique identifying information. The ephemeral identifier may be periodically replaced or updated with a new value. The record for each user may include an indication of an update frequency or an expiration time for the ephemeral identifier assigned to the user. In one example, the provider 130 may set a minimum expiration time (e.g., one day) or update frequency (e.g., one hour) for all ephemeral identifiers. The update frequency or expiration time may be configured by the provider 130, or individually by each user.

As an example scenario of D2D device discovery and communication, suppose the first user 110, is going to a public place such as a retail shopping mall. While at the shopping mall location, the first user 110 is interested in finding and meeting known friends and contacts in-person (e.g., second user 114). He activates a "friend-finder" software application on his device 112 to discover whether any of his friends are located in proximity to his current location. The first device 112 performs a broadcast of a discovery message or like discovery technique via a wireless communication medium (e.g., an IEEE 802.11 P2P network broadcast). The discovery message may include an ephemeral identifier that may be received by the second device 116 of second user 114. The ephemeral identifier may be utilized by the second user 114 to confirm the real identity of first user 110, and to facilitate the exchange of D2D authentication data between first device 112 and the second device 116.

While it may be possible for the third-party 120 to receive an ephemeral identifier being broadcast from either of devices 112, 116, the provider 130 may be configured to not release any private information to the third-party 120 without express user permission or input if the third-party 120 is unknown to either of the users 110, 114.

In this manner, the first user 110 and the second user 114 may each publicly broadcast an ephemeral identifier, initiate communication with each other upon verification that received ephemeral identifiers are associated with a known user, while preventing the third-party 120 from obtaining identifying information from either the first user 110 or the second user 114. The use of a shared encryption key may also facilitate encrypted communications between the first user 110 and the second user 114 such that the third-party 120 is prevented from effectively eavesdropping on communications 118.

While the exemplary communication system 100 of FIG. 1 depicts only two users 110, 114, any combination of multiple users, devices, servers and the like may be coupled to network 105 in various embodiments. For example, three or more users located in a venue, such as a building, campus, mall area, or other area, and may utilize any number of mobile wireless-enabled computing devices to exchange ephemeral identifiers anonymously. Upon verifying that the three users have registered with the provider 130, the provider 130 may send each of the three users a private identity for the other two. In this manner the three users may be able to simultaneously participate in a three-way communication session (e.g., three-way chat).

Although communication system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

Figure 2:
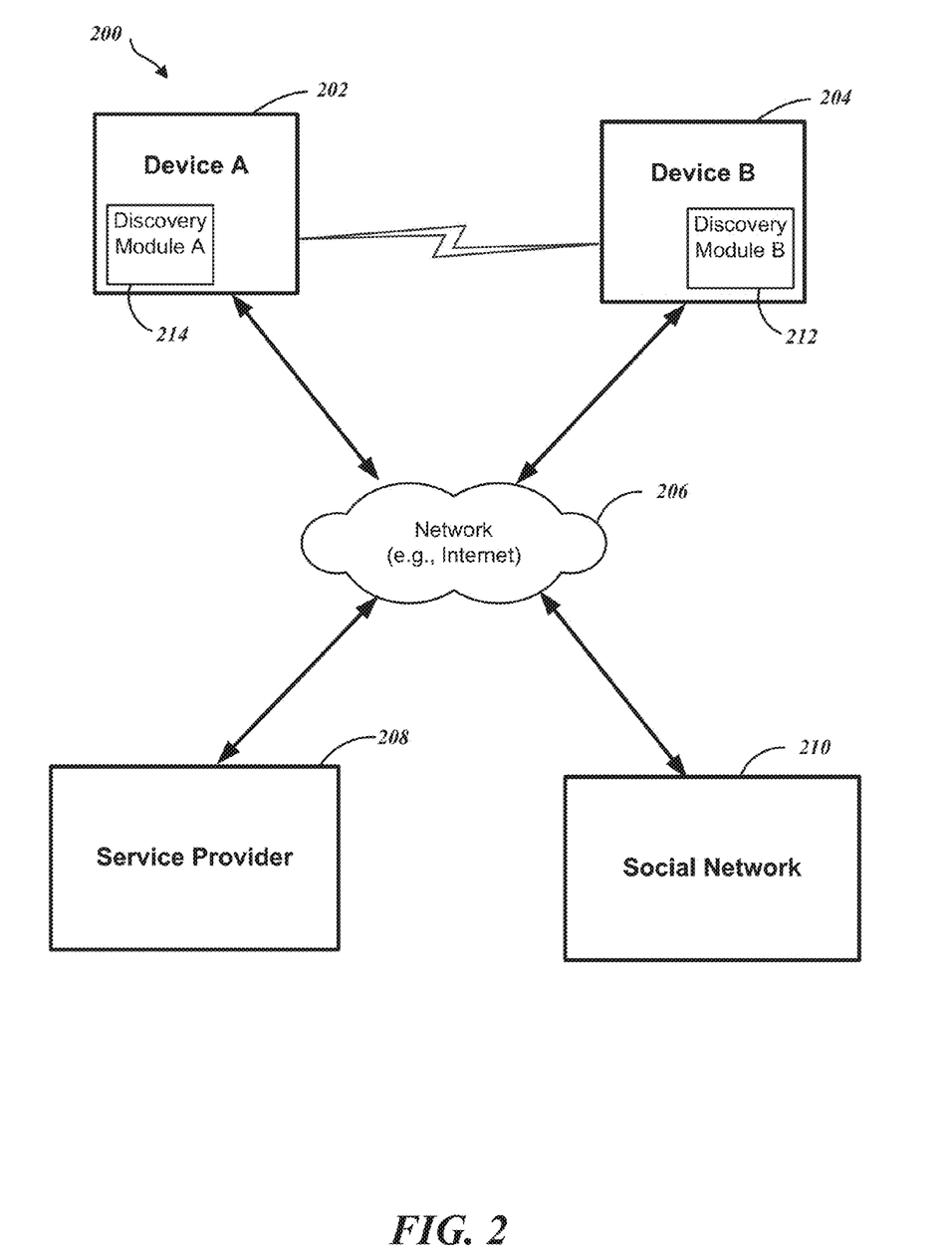
FIG. 2 is a block diagram of an example communication system in accordance with some embodiments.

FIG. 2 is a block diagram of an example communication system 200. The exemplary communication system 200 may include a first device 202 and a second device 204 that are both capable of wireless communication. The devices 202, 204 may communicate directly, or through a network 206. The devices 202, 204 may also communicate with a service provider 208 through the network 206. The service provider 208 may access a social network 210 directly, or though the network 206. In an example, the first device 202 may be a mobile computing device (e.g., a smartphone, a laptop, a tablet computer, or personal digital assistant) and the second device 204 may be a base station or a fixed wireless router. The second device 204 may be configured to provide a service, such as media content streaming or coupons/deals, to a user of the first device 202 who has registered for the service with a content provider. In another example, both the first device 202 and the second device 204 are mobile computing devices.

The social network 210 may include any collection of records that indicate two or more users have a connection. For example, FACEBOOK of Palo Alto, Calif., or LINKEDIN of Mountain View, Calif., provides social networks that may be utilized by multiple users to indicate a connection (e.g., personal, business, social or other relationship) between users. In an example, not depicted, the service provider 208 may include a social network. In another example, the social network 210 may act as a service provider.

In an example, devices 202, 204 may each include a discovery module 214, 212. The discovery modules 214, 212 may be configured to transmit an ephemeral identifier from their respective devices that is assigned to the device, or to a user of the device, by service provider 208. The discovery modules 214, 212 may be configured to interact with the service provider 208 to identify a real identity of any unknown ephemeral identifiers that are received by devices 202, 204. The discovery modules 214, 212 may be implemented as a software application executing on a processor of a device (such as devices 202, 204), or as a hardware module (e.g., FPGA, chip, communication controller, or circuit) that may interact with other modules or components of the devices 202, 204. The discovery modules 214, 212 may be configured to request input from a user of the devices 202, 204 before beginning communication with an unknown or newly identified device, or the discovery modules 214, 212 may be configured to initiate communication with any user or device that is known (e.g., through registration with the service provider 208) to a user. The service provider 208 may maintain a record of the ephemeral identifier and a private identifier associated with each device 202, 204 or discovery module 214, 212, as well as a record of all users or devices that are known to a user of each device.

In an example, the discovery module 214 may communicate a request to the service provider 208 via network 206 to verify that an ephemeral identifier received from device 204 is associated with a user known to the user of device 202. Upon locating a record identifying a user associated with the ephemeral identifier, the service provider 208 may query the social network 210 to determine if the identified user is known to the requesting user.

A user may dynamically designate a group of other users that are allowed to decode the user's ephemeral identity. The user may also differentiate a degree of identity available from the same ephemeral identity based on the person or device that requests the identity behind the ephemeral identity. For example, the user may instruct a server at the service provider to provide the user's phone number and e-mail address to close friends or family, but only provide the user's e-mail address, or an alternative e-mail address, to new acquaintances or business relations.

Figure 3:
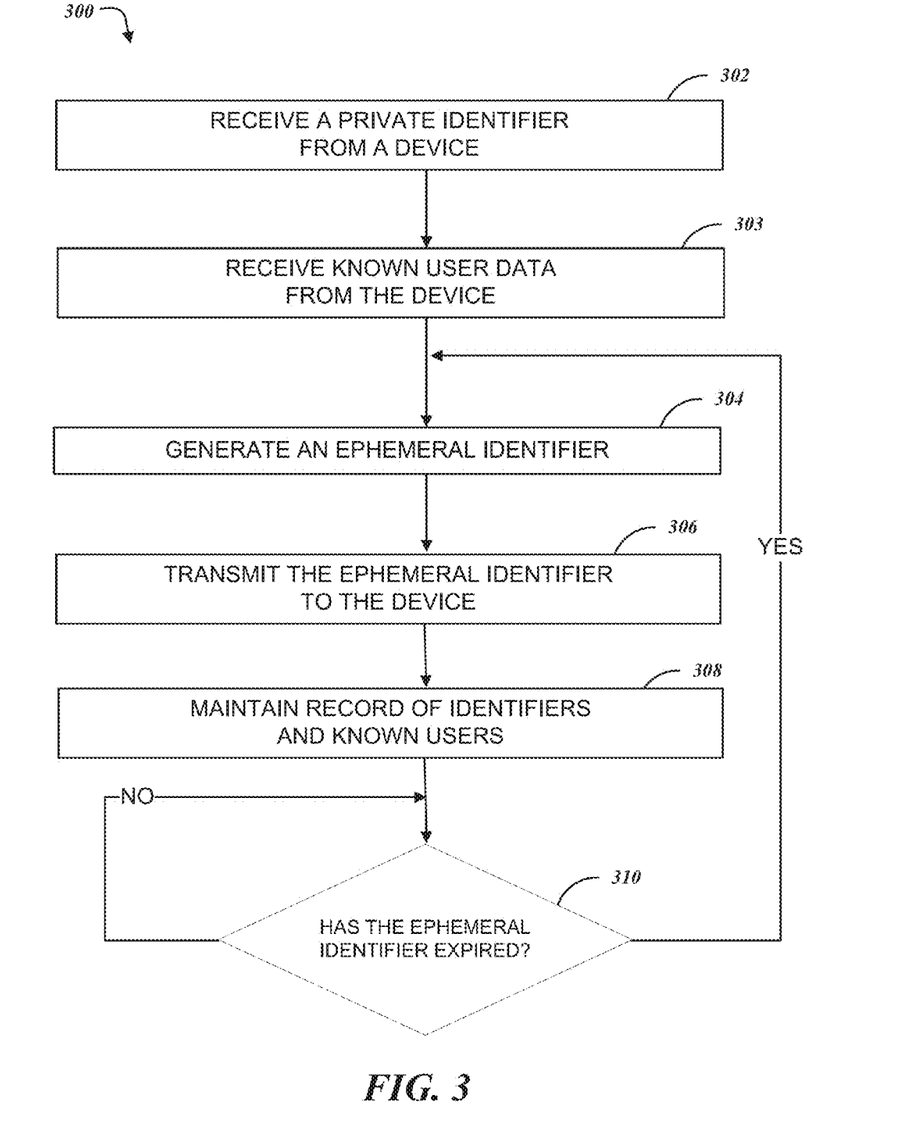
FIG. 3 is a flowchart illustrating an example method for establishing communication between devices in accordance with some embodiments.

FIG. 3 is a flowchart illustrating an example method 300 for registering a device with a service provider, such as service provider 208. In an example, the method 300 may include operations for receiving a private identifier from a device at 302, receiving known user data at 303, generating an ephemeral identifier for the device at 304, transmitting the ephemeral identifier to the device at 306, maintaining a record of identifiers for one or more devices at 308, and checking for the expiration of ephemeral identifiers at 310. These operations may also be performed on the server 132, or a combination of servers or processors in communication with database 134 of FIG. 1.

For example, at 302, a provider 130 (or service provider 208) may receive a private identifier, such as an e-mail address, telephone number, internet protocol address, or other user identifying information, from the device (e.g., mobile device 112). At 303, the provider 130 may receive known user data from the device. The known user data may include a list, or other data structure, of identifying information indicating persons or devices that the owner of the device may wish to communicate with, and who may receive personally identifying information from the provider 130. For example, a user may instruct a device, such as a mobile smartphone, to transmit a list of contact information to the provider 130. The contact information may include e-mail address or telephone numbers that are stored in the mobile smartphone. The provider 130 may also be configured to receive instructions from a user to add or revoke permissions for individual people or devices, or groups of people or devices.

At 304, the provider 130 may generate an ephemeral identifier. The ephemeral identifier may be any alpha-numeric code or sequence that the service provider may uniquely identify as being associated with the device. At 306, the service provider may transmit the ephemeral identifier to the device. At 308, the service provider may maintain a record of both the private identifier received from the device as well as the generated ephemeral identifier. The record and identifiers may be stored in a database, such as database 134 of FIG. 1.

At 310, the service provider may periodically check to determine whether or not an ephemeral identifier for the device has expired. If the ephemeral identifier has not expired the service provider may wait a specified period of time before rechecking the ephemeral identifier. If the ephemeral identifier has expired, then the service provider may generate a new ephemeral identifier at 304. The new ephemeral identifier may be transmitted to the device, as at 306. At 308, the record of the identifiers may be updated.

Though arranged serially in the example of FIG. 3, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Figure 4:
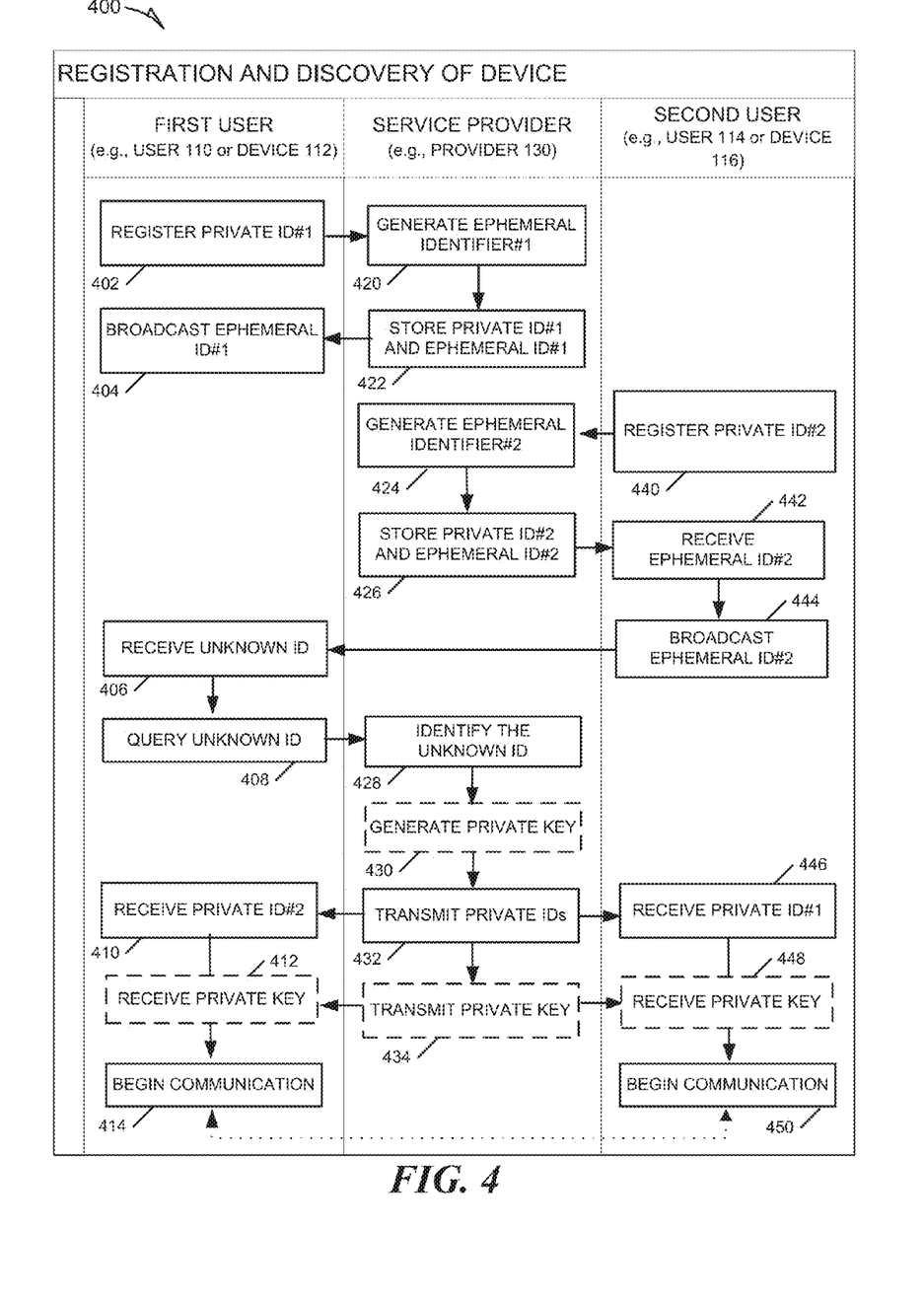
FIG. 4 is a swim-lane chart illustrating the operation of a method for registration and discovery of a device in accordance with some embodiments.

FIG. 4 is a swim-lane chart illustrating the operation of a method 400 for registration and discovery of wireless-capable mobile devices, such as devices 202, 204 of FIG. 2. The method 400 illustrates example interactions between a first user (e.g., mobile device 112), a service provider (e.g., provider 130), and a second user (e.g., mobile device 116) in registering, discovering, identifying, and communicating with the use of ephemeral identifiers, according to an example embodiment. These interactions may be conducted over a network, such as network 105, or any other appropriate wired or wireless network or protocol.

At 402, the method 400 may begin with the mobile device 112 registering a private identity with the provider 130. The private identity may include any uniquely identifying information such as a phone number, an e-mail address, a name, a user-id, or other personal data. The private identity may include a username, e-mail address, or other identifying information associated with a social network. At 420, the method 400 may continue with the service provider generating an ephemeral identifier to be associated with the mobile device 112. At 422, the provider 130 may store a record, for example in a data store, such as database 134. The service provider may also transmit the generated ephemeral identifier to the mobile device 112. At 404, the mobile device may begin broadcasting the ephemeral identifier in response to the receipt of the ephemeral identifier from the service provider, or in response to a user input at mobile device 112.

At 440, the method 400 may continue with the mobile device 116 registering a private identity with the provider 130. At 424, the method may continue with the provider 130 generating an ephemeral identifier to be associated with the mobile device 116. At 426, the provider 130 may store a record, for example in a data store, such as database 134. The provider 130 may also transmit the generated ephemeral identifier to the mobile device 116. At 442, the mobile device 112 may receive its ephemeral identifier from the provider 130, and at 444 begin broadcasting the ephemeral identifier in response to the receipt of the ephemeral identifier from the provider 130, or in response to a user input at mobile device 116.

In reference to system 100, the method 400 may continue at 406 with the receipt of an unknown identifier by mobile device 112. In this example, the unknown identifier is the ephemeral identifier assigned to mobile device 116. For example, the first user 110 and the second user 114 may have configured an application in their respective devices 112, 116, to broadcast their associated ephemeral identifiers over a wireless protocol.

At 408, the mobile device 112 may query the provider 130 with the unknown identifier. At 428, the service provider may receive the query from the mobile device 112 and attempt to identify the unknown identifier. At 428, the provider 130 may attempt to look up, or otherwise retrieve a record of an identity, phone number, or other private identifier associated with the unknown identifier. In an example, the provider 130, may be an embodiment of service provider 208 that is configured to access social network 210 (FIG. 2). If the unknown identifier is determined to match the ephemeral identifier assigned to mobile device 116, then at 432, the private identifier (e.g., the phone number) of mobile device 116 is transmitted to mobile device 112 if user 110 has established with the provider 130 that user 114 is known. Similarly, if mobile device 112 is broadcasting its assigned ephemeral identifier and within a wireless communication range of device 116, then device 116 may receive the broadcast identifier and query provider 130 as to whether or not the private identity is known to user 114.

Also, at 432, the service provider may transmit the private identifier (e.g., the phone number) of mobile device 112 to the mobile device 116 if user 114 has established with the provider 130 that user 110 is known. For example, the service provider 208 may query the social network 210 with the private identifier associated with the unknown identifier, and the private identity registered by mobile device 112. If the private identifier is associated with the unknown identifier, and the private identity registered by mobile device 112 has a known relationship within the social network 210, then the provider 130 may facilitate that communication between the two users 110, 114.

At 410, first device 112 receives the private identifier assigned to mobile device 116. Similarly, at 446, device 116 may receive the private identifier assigned to mobile device 112. The devices 112, 116 may utilize the ephemeral identifier of the other device to initiate communications, or throughout a communication session, in order to hide their identities from potential third parties or other devices.

The method 400 is complete at 414, when the first device 112 begins communication with the second device 116. Similarly, at 450, the second device 116 may begin communication with the first device 112. In this manner mobile device 112 and mobile device 116 are able to anonymously broadcast unique identifiers that are not publically associated with the private identities of user 110 or user 114, and thereby reduce the risk of a third party identifying either user 110 or user 114 based on their broadcasts.

Optionally, method 400 may include the generation and distribution of a private key that may be used to encrypt communication between users. For example, at 430, the provider 130 may generate a private key to facilitate encrypted communication between the devices 112, 116. At 434, the provider 130 may transmit the private key to the devices 112, 116. At 412, device 112 may receive the private key, and similarly, at 448, device 116 may receive the private identifier assigned to mobile device 112.

Figure 5:
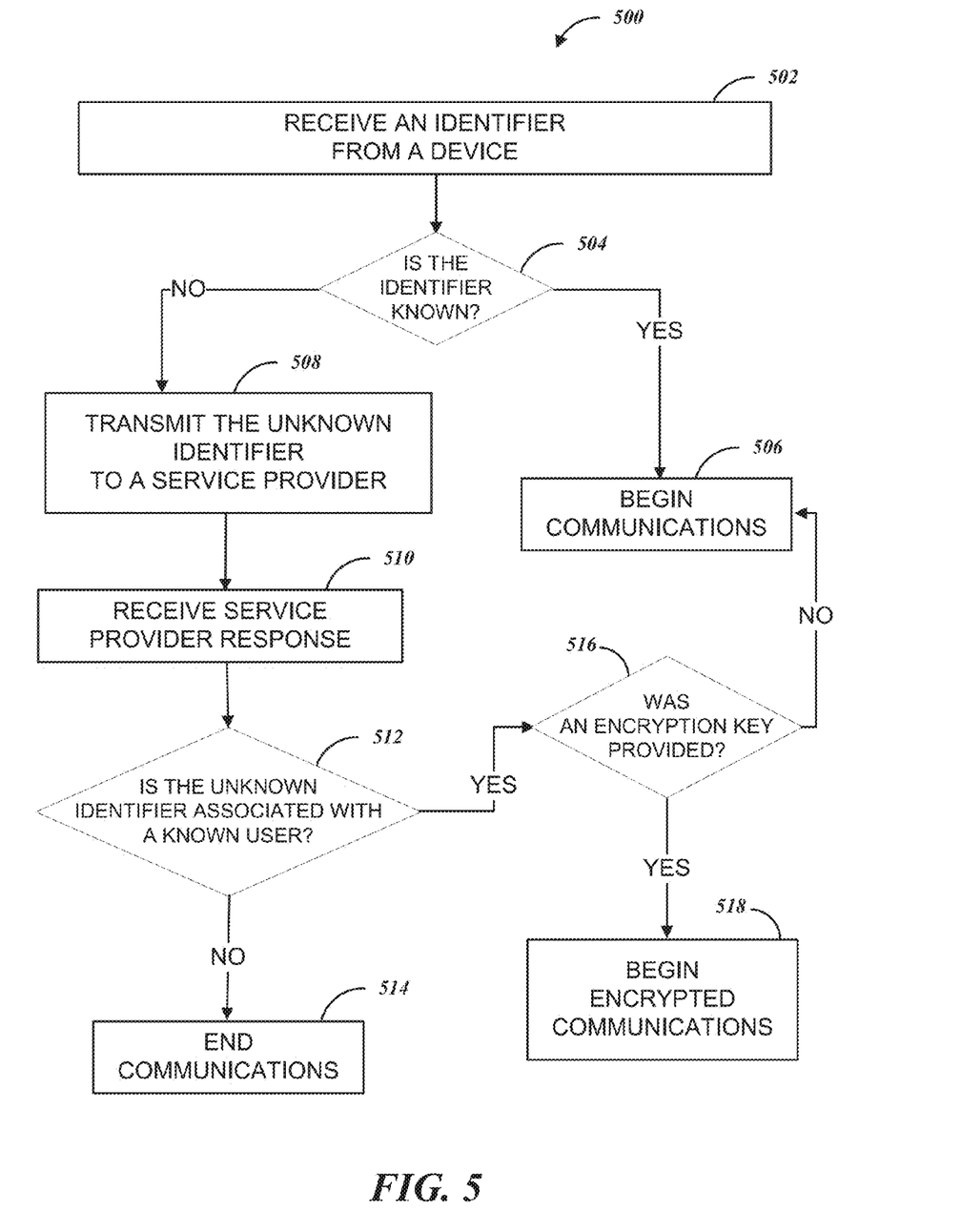
FIG. 5 is flow diagram a illustrating the operation of a method for initiating communication with an unknown device.

FIG. 5 illustrates the operation of a method 500 for initiating communication with an unknown device. At 502, a first device may receive an identifier from a second device. The identifier may be an ephemeral identifier that was publicly broadcast by the second device. In an example, at 504, the first device may check to determine if the identifier received from the second device is known. For example, if the users of the first and second devices had previously established a communication session, then the first device may have retained a record of a known private identity associated with the identifier. If it is determined that the identifier is known, at 506, the first device and the second device may automatically begin communications without an input from a user. If it is determined that the identifier is not known to the first device, then, at 508, the first device may transmit the unknown identifier to a service provider. In an example, the first device may also transmit a private identifier associated with the first device or a user of the first device to the service provider along with the unknown identifier.

In response to receiving an identifier, the service provider may check to determine if the unknown identifier broadcast by the second device is registered with the service provider and if a known identity is associated with the unknown identifier (e.g., method 400 of FIG. 4). If a known identity is associated with the unknown identifier, then a relationship check is made to determine if the known identity is associated with a user that is known to the user of the first device. The relationship check may be performed by accessing a social network with the private identifier provided by the first device to determine if a relationship exists between the user of the first device and the user of the second device.

At 510, the first device receives a response from the service provider. At 512, a check is made to determine if the response included the private identifier, or any other indication of identity, associated with the unknown identifier. If the response indicated that the unknown identifier could not be associated with anyone known to the service provider to be known to the user of the first device, then at 514, the first device may end or ignore any further communications from the second device. If the check, at 512, determined that a known identity is associated with the unknown identifier, then, at 516, an optional check may be made to determine if an encryption key was provided with the response from the service provider. If no encryption key was provided, then at 506, the first device and the second device may automatically begin communications. Communications may begin with, or without, an input from a user on either the first device or the second device. If an encryption key was provided in the response from the service provider, then, at 518, the first device and the second device may begin encrypted communications. A negotiation may be performed between the first device and the second device to verify that both the first device and the second device received a compatible or identical encryption key.

Though arranged serially in the example of FIG. 5, other examples may reorder the operations, omit one or more operations, and/or execute two or more operations in parallel using multiple processors or a single processor organized as two or more virtual machines or sub-processors. Moreover, still other examples may implement the operations as one or more specific interconnected hardware or integrated circuit modules with related control and data signals communicated between and through the modules. Thus, any process flow is applicable to software, firmware, hardware, and hybrid implementations.

Although the preceding examples indicated the use of device-to-device communications in connection with 3GPP and 802.11 standard communications, it will be understood that a variety of other communication standards capable of facilitating device-to-device, machine-to-machine, and P2P communications may be used in connection with the presently described techniques. These standards include, but are not limited to, standards from 3GPP (e.g., LTE, LTE-A, HSPA+, UMTS), IEEE 802.11 (e.g., 802.11a, 802.11b, 802.11g, 802.11n, 802.11ac), 802.16 (e.g., 802.16p), or Bluetooth (e.g., Bluetooth 4.0, or other standard defined by the Bluetooth Special Interest Group) standards families. Bluetooth, as used herein, may refer to a short-range digital communication protocol defined by the Bluetooth Special Interest Group, the protocol including a short-haul wireless protocol frequency-hopping spread-spectrum (FHSS) communication technique operating in the 2.4 GHz spectrum.

Figure 6:
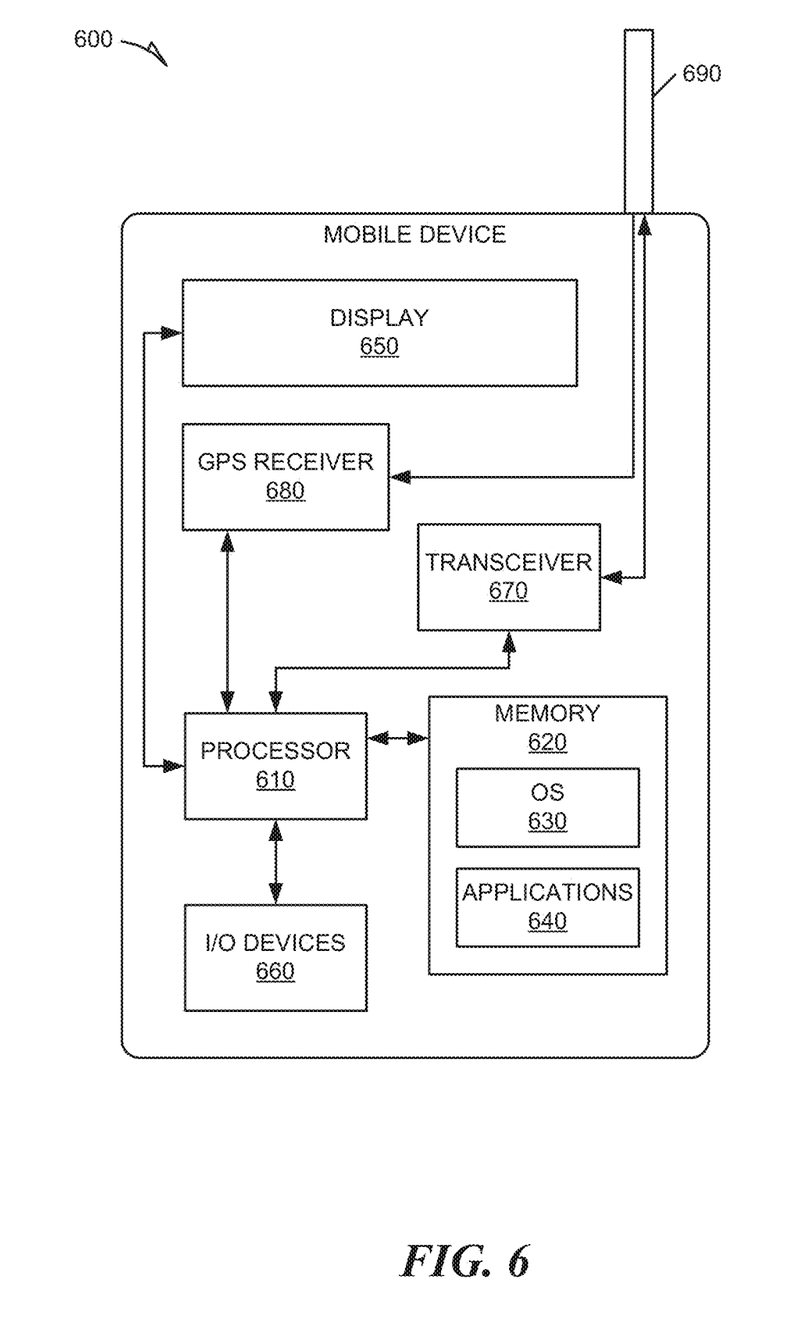
FIG. 6 is a block diagram illustrating a mobile device in accordance with some embodiments.

FIG. 6 is a block diagram illustrating a mobile device 600, upon which any one or more of the techniques (e.g., methodologies) discussed herein may be performed. The mobile device 600 may include a processor 610. The processor 610 may be any of a variety of different types of commercially available processors suitable for mobile devices, for example, an XScale architecture microprocessor, a Microprocessor without Interlocked Pipeline Stages (MIPS) architecture processor, or another type of processor. A memory 620, such as a Random Access Memory (RAM), a Flash memory, or other type of memory, is typically accessible to the processor 610. The memory 620 may be adapted to store an operating system (OS) 630, as well as application programs 640. The processor 610 may be coupled, either directly or via appropriate intermediary hardware, to a display 650 and to one or more input/output (I/O) devices 660, such as a keypad, a touch panel sensor, a microphone, etc. Similarly, in an example embodiment, the processor 610 may be coupled to a transceiver 670 that interfaces with an antenna 690. The transceiver 670 may be configured to both transmit and receive cellular network signals, wireless data signals, or other types of signals via the antenna 690, depending on the nature of the mobile device 600. Further, in some configurations, a GPS receiver 680 may also make use of the antenna 690 to receive GPS signals.

Figure 7:
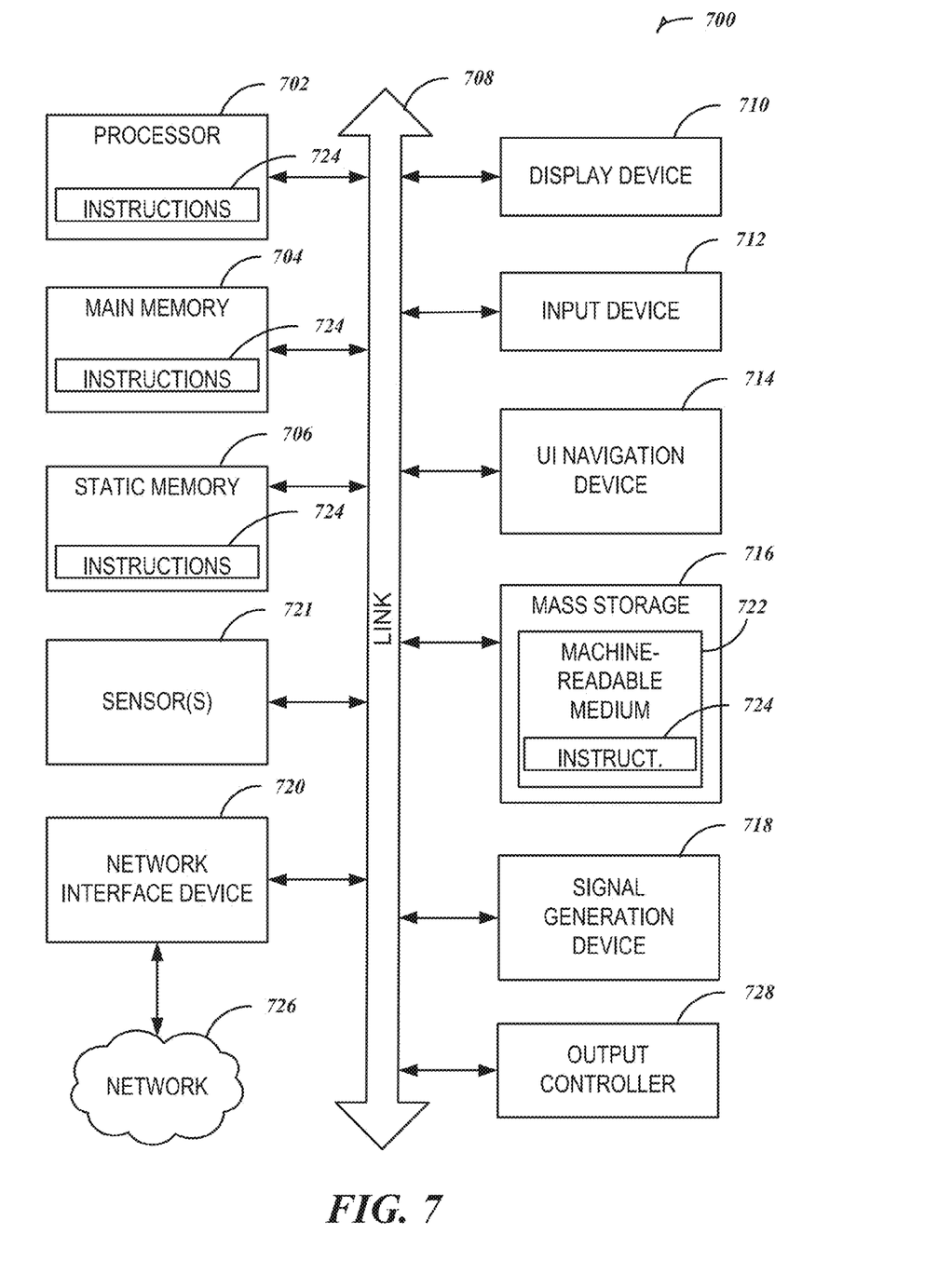
FIG. 7 is a diagrammatic representation of a machine in the example form of a computer system within which a set of instructions for causing the machine to perform any one or more of the methodologies discussed herein may be executed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a processing unit, a graphics processing unit (GPU), a hardware processor core, or any combination thereof), a main memory 704, and a static memory 706, some or all of which may communicate with each other via a link 708 (e.g., a bus, link, interconnect, or the like). The machine 700 may further include a display device 710, an input device 712 (e.g., a keyboard), and a user interface (UI) navigation device 714 (e.g., a mouse). In an example, the display device 710, input device 712, and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, camera, video recorder, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The mass storage 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage 716 may constitute machine-readable media.

While the machine-readable medium 722 is illustrated as a single medium, the term "machine readable medium" may include a single medium or multiple media (e.g., a centralized or distributed database, and/or associated caches and servers) that configured to store the one or more instructions 724.

The term "machine-readable medium" may include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 700, and includes digital or analog communications signals or other intangible medium to facilitate communication of such software.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 8:
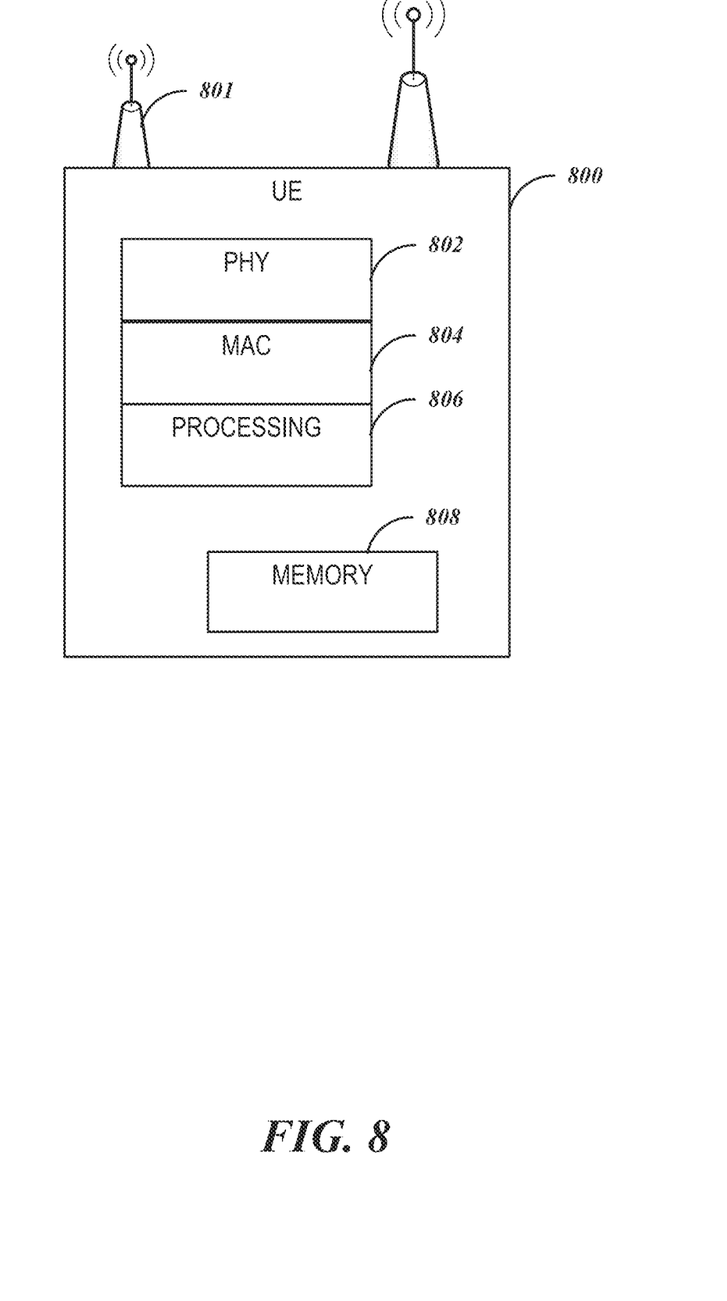
FIG. 8 illustrates a functional block diagram of user equipment (UE) in accordance with some embodiments.

FIG. 8 illustrates a functional block diagram of a UE 800 in accordance with some embodiments. The UE 800 may be suitable for use as device 112 (FIG. 1) or device 202 (FIG. 2). The UE 800 may include physical layer circuitry 802 for transmitting and receiving signals to and from eNBs using one or more antennas 801. UE 800 may also include processing circuitry 806 that may include, among other things a channel estimator. UE 800 may also include a memory 808. The processing circuitry may be configured to determine several different feedback values discussed below for transmission to the eNB. The processing circuitry may also include a media access control (MAC) layer 804.

In some embodiments, the UE 800 may include one or more of a keyboard, a display, a non-volatile memory port, multiple antennas, a graphics processor, an application processor, speakers, and other mobile device elements. The display may be an LCD screen including a touch screen.

The one or more antennas 801 utilized by the UE 800 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

Although the UE 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 800 may be configured with the instructions to perform the operations described herein.

In some embodiments, the UE 800 may be configured to receive OFDM communication signals over a multicarrier communication channel in accordance with an OFDMA communication technique. The OFDM signals may comprise a plurality of orthogonal subcarriers. In some broadband multicarrier embodiments, eNBs (including macro eNB and pico eNBs) may be part of a broadband wireless access (BWA) network communication network, such as a Worldwide Interoperability for Microwave Access (Wi-MAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the inventive subject matter described herein is not limited in this respect. In these broadband multicarrier embodiments, the UE 800 and the eNBs may be configured to communicate in accordance with an orthogonal frequency division multiple access (OFDMA) technique. The UTRAN LTE standards include the 3rd Generation Partnership Project (3GPP) standards for UTRAN-LTE, release 8, March 2008, and release 10, December 2010, including variations and evolutions thereof.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier x one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 800 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the UE 800 may be part of a portable wireless communication device, such as a PDA, a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some LTE embodiments, the UE 800 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 800. The CQI allows the UE 800 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a first user equipment (UE) device for establishing a device-to-device wireless connection comprising:
    registering the first UE device with a service provider including providing, from the first UE device, a first private identifier;
    receiving, at the first UE device and in response to registering, a first ephemeral identifier over a network from a service provider;
    broadcasting, from the first UE device, the first ephemeral identifier over an unencrypted wireless medium;
    receiving, at the first UE device, a second ephemeral identifier from a second device;
    communicating the second ephemeral identifier to the service provider to determine whether a first user of the first UE device knows a second user associated with the second ephemeral identifier; and
    in response to receiving a communication from the service provider indicating (a) that the first user is connected with the second user on a social network and (b) a second private identifier provided from the second device to the service provider in registering the second device with the service provider, establishing a device-to-device connection between the first UE device and the second device utilizing the first ephemeral identifier and the second ephemeral identifier.

2. The method of claim 1, comprising:
    periodically receiving an updated ephemeral identifier from the service provider at the first device; and
    broadcasting, from the first device, the updated ephemeral identifier in place of the first ephemeral identifier.

3. The method of claim 1, wherein communicating with the service provider further includes transmitting the first ephemeral identifier to the service provider.

4. The method of claim 1, wherein the network includes an evolved NodeB (eNB) of a Long Term Evolution/Long Term Evolution-Advanced (LTE/LTE-A) network; and
    wherein the first private identifier includes one or more of a phone number, an e-mail address, and a username of the first user.

5. The method of claim 1, further comprising:
receiving; at the first device, a shared encryption key from the service provider in response to the communication from the service provider; wherein establishing the wireless connection is further performed using the shared encryption key to create a secure wireless connection.

6. The method of claim 1, wherein the device-to-device connection is established between the first device and the second device to create a direct wireless network connection, the direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

7. The method of claim 1, wherein the first device includes a UE comprising processing circuitry arranged to communicate with an evolved NodeB (eNB);
wherein the network includes a Long Term Evolution/Long Term Evolution-Advanced (LTE/LTE-A) network; and
where in the first device is configured to establish a device-to-device wireless connection for direct device-to-device communications independent of the LTE/LTE-A network with a second wireless communications device, by performing operations to communicate with the service provider over the LTE/LTE-A network to verify the identity of the unknown identifier.

8. A communication method comprising:
receiving, at a processor and over a network, a first private identifier from a first user equipment (UE) device;
generating, at the processor, a first ephemeral identifier in response to receiving the first private identifier;
receiving, at the processor and over the network, a second private identifier from a second UE device;
generating, at the processor, a second ephemeral identifier in response to receiving the second private identifier;
transmitting the first ephemeral identifier to the first UE device over the network;
transmitting the second ephemeral identifier to the second UE device over the network;
storing, on a tangible computer readable medium coupled to the processor, a record including: the first private identifier, the first ephemeral identifier, and user relationship data indicating entities with which the first user is linked with on a social network;
periodically updating the first ephemeral identifier in the record with a new value and transmitting the new value to the first UE device over the network;
receiving; from the first UE device; the second ephemeral identifier and the first ephemeral identifier;
identifying whether a second user associated with the second ephemeral identifier is an entity of the entities with which the first user is linked on the social network; and
in response to identifying that the first user and the second user are linked, providing the second private identifier to the first UE device.

9. The method of claim 8, further comprising:
receiving the first private identifier from the first UE device contemporaneously with the unknown identifier.

10. The method of claim 8, further comprising:
generating a shared encryption key;
providing the shared encryption key to the first UE device; and
providing the shared encryption key to the second UE device.

11. A user equipment (UE), comprising a memory coupled to processing circuitry, the processing circuitry arranged to communicate with an evolved NodeB (eNB) of a Long Term Evolution/Long Term Evolution-Advanced (LTE/LTE-A) network and to authenticate a device-to-device wireless connection for direct device-to-device communications independent of the LTE/LTE-A network between a first wireless communications device and a second wireless communications device, by performing operations to:
receive a first private identifier from the first wireless communications device;
generate a first ephemeral identifier in response to receiving the first private identifier;
receive a second private identifier from the first wireless communications device;
generate a second ephemeral identifier in response to receiving the second private identifier;
transmit the first ephemeral identifier to the first wireless communications device;
transmit the second ephemeral identifier to the first wireless communications device;
store, on the memory, a record including: the first private identifier, the first ephemeral identifier, and user relationship data indicating entities with which the first user is linked with on a social network;
periodically update the first ephemeral identifier in the record with a new value
receive, from the first wireless communication device, the second ephemeral identifier and the first ephemeral identifier;
identify whether a second user associated with the second ephemeral identifier is an entity of the entities with which the first user is linked on the social network; and
in response to identifying that the first user and the second user are linked, providing the second private identifier to the first wireless communication device.

12. The UE of claim 11, comprising circuitry arranged to:
receive the first ephemeral identifier from the first wireless communications device contemporaneously with the unknown identifier.

13. The UE of claim 11, comprising circuitry arranged to:
generate a shared encryption key from the service provider in response to verifying with the service provider;
transmit the shared encryption key to the first wireless communications device; and
transmit the shared encryption key to the second wireless communications device.

14. The UE of claim 11, wherein the device-to-device wireless connection is established between the first wireless communications device and the second wireless communications device to create a direct wireless network connection, the direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special interest Group standards family.

15. A user equipment (UE) comprising:
processing circuitry;
an antenna; and
a transceiver coupled to the processing circuitry and the antenna, the transceiver configured to:
receive a first ephemeral identifier, and broadcast the first ephemeral identifier in response to receiving the first ephemeral identifier;
wherein the processing circuitry is arranged to:
register a first device with a service provider including providing, from the first device, the first private identifier;
receive an unknown identifier from a wireless device,
transmit a request to the service provider to determine an identity associated with the unknown identifier,
receive a communication from the service provider indicating (a) that a user of the UE is connected with the identity on a social network and (b) a second private identifier corresponding to the identity associated with the unknown identifier and provided by the wireless device, and
in response to receiving the second private identifier, initiate a device-to-device wireless connection with the wireless device using the first and second ephemeral identifiers.

16. The UE of claim 15, wherein the transceiver is further configured to receive a new value at a periodic time interval to replace the ephemeral identifier.

17. The UE of claim 15, wherein the request further includes the first private identifier.

18. The UE of claim 15, wherein the device-to-device wireless connection is established between the UE and the wireless device to create a direct wireless network connection, the direct wireless network connection performing wireless communications in accordance with a standard from: a 3GPP Long Term Evolution or Long Term Evolution-Advanced standards family, a standard from an IEEE 802.11 standards family, a standard from an IEEE 802.16 standards family, or a standard from a Bluetooth Special Interest Group standards family.

19. The UE of claim 15, wherein the processor is further arranged to receive a shared encryption key in response to receiving the second private identifier, and the device-to-device wireless connection is established as an encrypted device-to-device wireless connection with the shared encryption key.

* * * * *

UNITED STATES PATENT AND TRADEMARK OFFICE
CERTIFICATE OF CORRECTION

PATENT NO. : 9,883,388 B2  
APPLICATION NO. : 13/712304  
DATED : January 30, 2018  
INVENTOR(S) : Kim et al.

Page 1 of 1

It is certified that error appears in the above-identified patent and that said Letters Patent is hereby corrected as shown below:

In the Claims

In Column 15, Line 2, in Claim 5, delete "receiving;" and insert --receiving,-- therefor In Column 15, Line 52, in Claim 8, delete "receiving;" and insert --receiving,-- therefor In Column 15, Line 52, in Claim 8, delete "device;" and insert --device,-- therefor In Column 16, Line 30, in Claim 11, after "value", insert --;--

In Column 16, Line 61, in Claim 14, delete "interest" and insert --Interest-- therefor Signed and Sealed this  
Twenty-first Day of April, 2020

Andrei Iancu  
*Director of the United States Patent and Trademark Office*